United States Patent
Bianconi

(10) Patent No.: US 12,393,925 B2
(45) Date of Patent: Aug. 19, 2025

(54) COMMUNICATION SYSTEM AND DISPLAY SYNCHRONIZATION

(71) Applicant: SumUp Payments Ltd., London (GB)

(72) Inventor: Stefano Bianconi, Berlin (DE)

(73) Assignee: SUMUP PAYMENTS LTD., London (GB)

( * ) Notice: Subject to any disclaimer, the term of this patent is extended or adjusted under 35 U.S.C. 154(b) by 256 days.

(21) Appl. No.: 18/000,257

(22) PCT Filed: Sep. 24, 2021

(86) PCT No.: PCT/US2021/051970
§ 371 (c)(1),
(2) Date: Feb. 27, 2023

(87) PCT Pub. No.: WO2022/067049
PCT Pub. Date: Mar. 31, 2022

(65) Prior Publication Data
US 2023/0206211 A1    Jun. 29, 2023

Related U.S. Application Data

(60) Provisional application No. 63/082,749, filed on Sep. 24, 2020.

(51) Int. Cl.
*G06Q 20/20* (2012.01)
*G06K 7/00* (2006.01)
(Continued)

(52) U.S. Cl.
CPC .............. *G06Q 20/34* (2013.01); *G06K 7/006* (2013.01); *G06K 7/0091* (2013.01);
(Continued)

(58) Field of Classification Search
CPC ........ G06Q 20/34; G06Q 20/20; G06K 7/006; G06K 7/0091; G06K 7/10297;
(Continued)

(56) References Cited

U.S. PATENT DOCUMENTS 7,387,256 B2    6/2008  Zhu et al.
9,740,342 B2    8/2017  Paulsen et al.
(Continued)

FOREIGN PATENT DOCUMENTS

CN    106453843 A    2/2017
EP    2637132 A1     9/2013
WO    2020119230 A1  6/2020

OTHER PUBLICATIONS

"UM10819 PN7120 User Manual" PN7120 User Manual for an NFC Controller by NXP, Apr. 3, 2015, retrieved from the Internet.
(Continued)

*Primary Examiner* — Brent D Castiaux
(74) *Attorney, Agent, or Firm* — Synergy Patent Group, LLC

(57) ABSTRACT

Various aspects of the disclosure generally relate to point-of-sale credit card processing devices. More specifically, the disclosure relates to synchronizing device communications with other device functions in order to reduce cross-platform interference and meet certification requirements.

17 Claims, 10 Drawing Sheets

(51) Int. Cl.
*G06K 7/10* (2006.01)
*G06Q 20/34* (2012.01)
*G07F 7/08* (2006.01)
*G09G 3/36* (2006.01)

(52) U.S. Cl.
CPC ......... *G06K 7/10297* (2013.01); *G06Q 20/20* (2013.01); *G07F 7/0886* (2013.01); *G09G 3/36* (2013.01); *G09G 2310/02* (2013.01); *G09G 2340/0435* (2013.01)

(58) Field of Classification Search
CPC ............. G06K 7/0082; G06K 7/10168; G06K 7/10198; G06K 7/10237; G06K 19/0701; G07F 7/0886; G07F 7/0873; G07F 7/0893; G09G 3/36; G09G 2310/02; G09G 2340/0435; H04B 5/70; H04B 5/26; G07G 1/0018
See application file for complete search history.

(56) References Cited

U.S. PATENT DOCUMENTS

2013/0225075 A1\* 8/2013 Schmid ................. H04B 15/02
 455/41.1
2019/0311680 A1\* 10/2019 Koo .......................... G06F 3/14

OTHER PUBLICATIONS

International Searching Authority, International Search Report in re Int'l Appl. No. PCT/US2021/051970, Sep. 24, 2021.
International Searching Authority, Written Opinion of the International Searching Authority in re Int'l Appl. No. PCT/US2021/051970, Sep. 24, 2021.

\* cited by examiner

COMMUNICATION SYSTEM AND DISPLAY SYNCHRONIZATION

CROSS-REFERENCE TO RELATED APPLICATIONS

This application claims the benefit of and priority to international application PCT/US2021/051970, filed Sep. 24, 2021, entitled COMMUNICATION SYSTEM AND DISPLAY SYNCHRONIZATION, and is hereby incorporated by reference in its entirety, which in turn claims the benefit of and priority to U.S. Provisional Patent Application No. 63/082,749, filed Sep. 24, 2020, entitled Secure Point-of-Sale Device, and is hereby incorporated by reference in its entirety.

BACKGROUND

Field of the Disclosure

The disclosure relates generally to point-of-sale credit card processing devices and more specifically to managing interference of communication systems.

Description of Related Art

Fundamental to the functioning of the economy is the exchange of payment for goods and services. Throughout modern commercial history, payment has typically been rendered with money in the form of currency or cash such as banknotes and coins. Cash continues to be used to purchase goods and services, but it is becoming increasingly less common. In the United States, a study by Tufts University concluded that the cost of using cash amounts to around $200 billion per year. This is primarily the costs associated with collecting, sorting and transporting the physical currency, but also includes expenses like automated teller machine (ATM) fees. The study also found that the average American wastes five and a half hours per year withdrawing cash from ATMs, which is just one of the many inconvenient aspects of physical currency. Physical currency is often unhealthy too. Researchers in Ohio spot-checked cash used in a supermarket and found 87% contained harmful bacteria.

Conventional financial transactions are fundamentally based on the value of currency, but often involve the transfer of funds that do not require the physical exchange of cash.

In the United States, the Federal Reserve Bank's Automated Clearing House (ACH) Network is a processing and delivery system that provides for the distribution and settlement of electronic credits and debits among financial institutions, and functions as an electronic alternative to paper checks. Unlike a check, which is always a debit instrument, an ACH entry may be either a credit or a debit entry. The ACH Network is also widely used to settle consumer transactions made at ATMs and point-of-sale (POS) terminals.

Physical currency is already being replaced by cryptocurrencies like Bitcoin. Bitcoin allows for direct transfers of funds between parties, without the need for a third party. A wide range of startups are now developing products based on the Bitcoin protocols, in the hope that it will compete with other global payment systems. Cash transactions worldwide rose just 1.75% between 2008 and 2012, to $11.6 trillion. Meanwhile, non-traditional payment methods rose almost 14% to total $6.4 trillion. This group includes online and mobile payment systems including PayPal, Google Wallet, Apple Passbook, and other cashless alternatives.

Thrive Analytics 2014 Digital Wallet Usage Study revealed that, despite nearly 80% of consumers being aware of digital wallets, including major players like PayPal, Google Wallet, and Apple Passbook, security concerns remain the main barrier to adoption, followed by lack of usability versus credit cards/cash (37%) and not being top of mind as a form of payment at the time of purchase (32%). Meanwhile, MasterCard and Visa face obstacles as they try to become players in the digital wallet game.

Other companies produce a point-of-sale credit card reader and app that provides transparent pricing, reliable technology and is available for major credit cards plus Google Pay and Apple Pay. Contrasting this with a traditional credit card terminal, which contains the hardware and software for generating an authorization request, these card readers work in conjunction with online systems to generate that request. Security and ensuring the secrecy of user credit card information is paramount in any credit card reader and strict standards apply to the construction and operation of these POS readers. While meeting security standards, the makers of these readers must design a product that is compact and meets international standards for credit card payments.

SUMMARY

A point-of-sale credit card device may include a case and a display coupled to the case. The display may have a plurality of pixels and be configured to be refreshed during a plurality of refresh periods. Each of the refresh periods includes a write phase in which at least one of the plurality of pixels is addressed, and a dormant phase in which none of the plurality of pixels are addressed. A printed circuit board (PCB) may be coupled to the case. A display controller may be coupled to the PCB. The display controller may be configured to provide addressing for at least some of the plurality of pixels during the write phase. A near-field-communication (NFC) system may be coupled to the PCB and be configured to broadcast an NFC signal for near-field communication. The NFC system may be synchronized to the display refresh period and configured to begin broadcasting the NFC signal during the dormant phase based on the synchronization. The NFC system may be configured to receive a signal as the synchronization to the display refresh period. The display may further comprise a liquid crystal display (LCD), the signal being a tearing signal, the LCD may be further configured to transmit the tearing signal during the write phase and not transmit the tearing signal during the dormant phase. The NFC system may be further configured to begin broadcasting the NFC signal when the NFC system stops receiving the tearing signal. The signal may be a dormant signal, the dormant signal being on during the dormant phase and being off during the write phase. The NFC system may be further configured to begin broadcasting the NFC signal after the dormant signal goes on. The NFC system may be further configured to receive a clock signal and be programmed to begin broadcasting the NFC signal at a specific time interval based on the clock signal. The NFC system may be configured to begin broadcasting the NFC signal during the dormant phase. The NFC system may be further configured to have an operating mode and a test mode, the operating mode having a polling phase. The NFC system may be further configured to synchronize the broadcasting of the NFC signal with the display refresh only during the test mode. The NFC system may be further configured to synchronize the broadcasting of the NFC signal with the display refresh during the polling phase. The NFC system may be further configured to begin broadcasting the NFC signal during the dormant phase, continue broadcasting in an approximately continuous manner during the dormant phase, and stop broadcasting during the same dormant phase in which the NFC system began broadcasting. The NFC system may be further configured to begin broadcasting the NFC signal during the dormant phase, continue broadcasting in an approximately continuous manner through the dormant phase, and continue broadcasting into at least the write phase of the following refresh period. The NFC system may be further configured to broadcast approximately at a frequency of 13.56 MHz and to experience distortion of the NFC signal, from the display, during the write phase. The above device may be a credit card reader.

A method of reducing interference includes refreshing a display having a plurality of pixels by addressing at least one of the plurality of pixels during a write phase, entering a dormant phase in which none of the plurality of pixels is addressed, receiving a signal in a near field communication (NFC) system indicating that the dormant phase has been entered, and beginning a broadcast of an NFC signal during the dormant phase. Receiving a signal in an NFC system indicating that the dormant phase has been entered may include receiving a tearing signal until the end of the write phase, at which point the tearing signal stops, indicating an end to the write phase. Receiving a signal in an NFC system indicating that the dormant phase has been entered may include receiving a clock signal timed with an end to the write phase. The method may include any of: counting clock cycles in order to track the dormant phase, ending the broadcast of the NFC signal during the dormant phase, refreshing the display, after beginning a broadcast of an NFC signal, by addressing at least some of the plurality of pixels during the write phase, and ending the broadcast of the NFC signal after the beginning of the second display refresh.

A method of reducing interference in a credit card processing device may include refreshing a display having a plurality of pixels by addressing at least one of the plurality of pixels during a write phase, entering a dormant phase in which none of the plurality of pixels is addressed, synchronizing a start for broadcasting in a near field communication (NFC) system with the dormant phase, and broadcasting by the NFC system in the dormant phase. The method may include entering a test mode.

The foregoing has outlined rather broadly the gestures and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of this disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
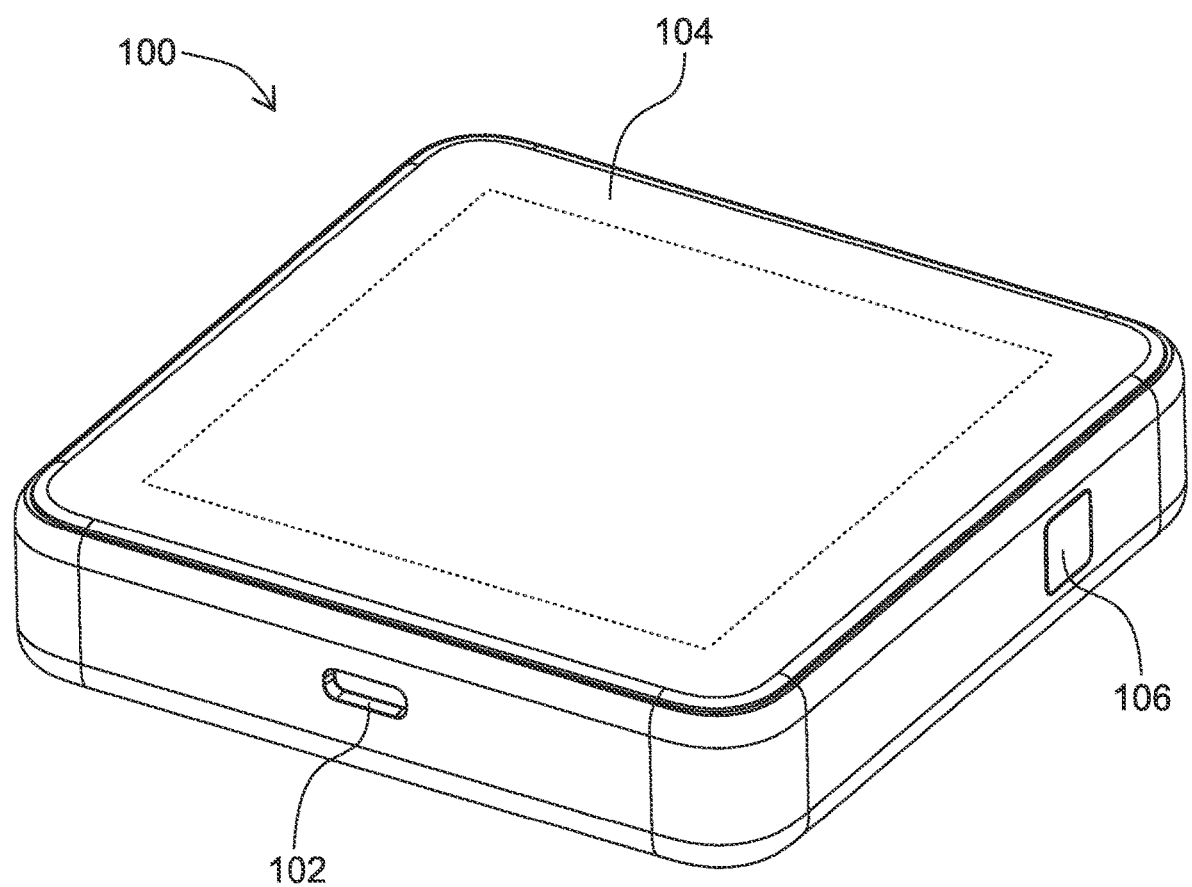
FIG. 1 is a top right perspective view illustrating one example of a credit card reader.

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure may be embodied by one or more elements of a claim.

A point-of-sale (POS) credit card reader may physically interact with payment instruments such as magnetic stripe payment cards, Europay, MasterCard and Visa (EMV) payment cards, and short-range communication (e.g., near field communication (NFC), radio frequency identification (RFID), Bluetooth, Bluetooth® low energy (BLE), etc.) payment instruments. The reader may provide a rich user interface through the display, communicate with the payment reader, and communicate with a payment processing service server, which may communicate with payment processing service provider server(s). In this manner, the reader may collectively process transaction(s) between a merchant and customer(s).

POS readers may be mobile, such that POS readers may process transactions in disparate locations across the world. For various reasons, a payment processing service provider may contract with a payment processing service regarding where the payment processing service is permitted to collectively process card-present transactions between merchants that utilize POS readers serviced by the payment processing service and customers. As a non-limiting example, a payment processing service provider may contract with a payment processing service such that the payment processing service is permitted to process card-present transactions on behalf of a merchant via a POS reader serviced by the payment processing service in one or more particular regions but is not permitted to process transactions on behalf of the merchant in any region that is not one of the one or more particular regions. For instance, a payment processing service provider may contract with a payment processing service such that the payment processing service is permitted to process card-present transactions on behalf of the merchant in the United States, Canada, and Australia, but is not permitted to process card-present transactions on behalf of the merchant in any other country. That is, if the merchant tries to transact with a customer in China via a card-present transaction using a POS reader serviced by the payment processing service and the payment processing service processes the card-present transaction, the payment processing service may breach its contract with the payment processing service provider. Accordingly, the payment processing service may refrain from processing the card-present transaction (i.e., the payment processing service may not transmit the card-present transaction to the payment processing service provider) to avoid breaking its contract with the payment processing service provider.

For the purpose of this disclosure, a card-present transaction is a transaction where both a customer and their payment instrument are physically present at the time of the transaction. Card-present transactions may be processed by swipes, dips, and/or taps. A swipe is a card-present transaction where a customer slides a card having a magnetic strip through a payment reader that captures payment data contained in the magnetic strip. A dip is a card-present transaction where a customer inserts a card having an embedded microchip (i.e., chip) into a payment reader chip-side first. The card remains in the payment reader until the payment reader prompts the customer to remove the card. While the card is in the payment reader, the microchip creates a one-time code which is sent from the POS reader to a server associated with a payment processing service, a bank, and/or a card payment network (e.g., Mastercard, VISA, etc.) to be matched with an identical one-time code. A tap is a card-present transaction where a customer may tap or hover his or her electronic device such as a smart phone running a payment application over a payment reader to complete a transaction via short-range communication (e.g., NFC, RFID, Bluetooth®, BLE, etc.). Short-range communication enables the electronic device to exchange information with the payment reader. A tap may also be called a contactless payment. In some countries, a customer may engage in a tap using a TAP card instead of an electronic device.

The phrases "in some examples," "according to various examples," "in the examples shown," "in one example," "in other examples," "various examples," "some examples," and the like generally mean the particular feature, structure, or characteristic following the phrase is included as at least one example, and may be included in more than one example without specifically being referred to as such. In addition, such phrases do not necessarily refer to the same examples or to different examples.

If the specification states a component or feature "may," "can," "could," or "might" be included or have a characteristic, that particular component or feature is not required to be included or have the characteristic.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates one example of credit card processing reader 100 such as a point-of-sale (POS) reader for on-premises credit card payments. Such readers typically meet industry requirements if used for processing Visa, Mastercard, American Express, JCB or Discover payments. The security standards are set by the Payment Card Industry Security Standards Council (PCI SSC), which also sets standards for personal identification number (PIN) transaction security (PTS). One of the security standards set is the Payment Card Industry Data Security Standard (PCI DSS). Other security standards are set by a European subgroup of the Joint Interpretation Library (JIL) working group, called the JIL Terminal Evaluation Methodology Subgroup, or JTEMS. The standards serve to protect against fraud and provide for secure entry and transmission of PIN and account data. POS terminals and readers are used in the retail, restaurant, entertainment, healthcare, and service industries, to name a few.

Reader 100 may be a standalone device, or it may be mounted within or on to a cradle, bracket or other holder (not illustrated) and interface through port 102. Port 102 may be any type of serial or parallel communication port, for example a universal serial bus (USB), or any other type of interface. In one example port 102 may be used to provide power to reader 100. In one example port 102 may be used for communication and power to reader 100. Other communication options for reader 100 are discussed below. On the side of reader 100 that is opposite port 102 is a slot (not visible in FIG. 1) into which a credit card may be inserted and read by a payment reader (not illustrated in FIG. 1). This describes a dip, but it should be understood that both a tap and a swipe are both included as potential transaction methods with an appropriately configured terminal, for example with near field communications(NFC). An NFC antenna (not shown in FIG. 1) may be located behind, for example, a display and enable interaction with other NFC devices. Display 104 may be any type of emissive or reflective display, or a combination thereof, for example LED, LCD, OLED, MEMS, ELD, QLED, etc. Additionally display 104 may be touch sensitive such that a user may interact with images present on display 104. Such interactions include viewing an amount to be charged to a card, transaction description, entry or selection of amounts for gratuity, signature input, transaction approval, and so on. Button 106 activates reader 100 and may be used to power down, power up, place reader 100 into a sleep/standby mode or awaken reader 100 from a sleep/standby mode.

Figure 2:
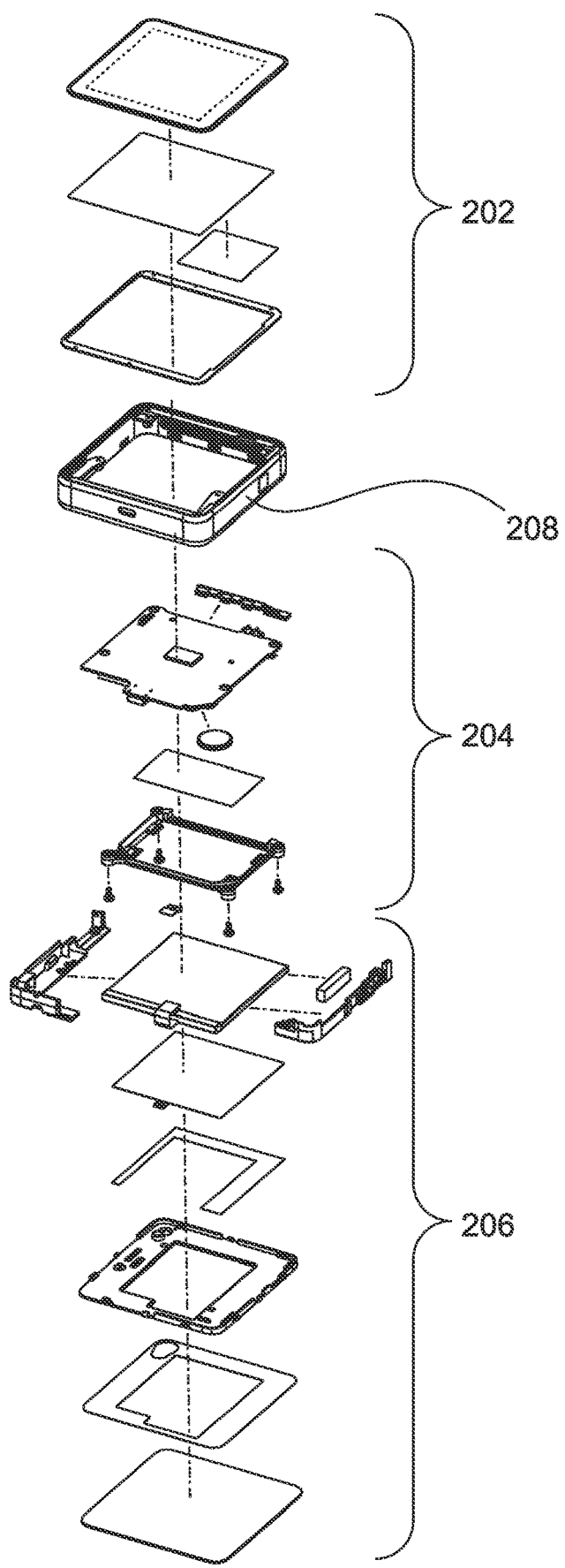
FIG. 2 is an exploded parts diagram illustrating one example of a credit card reader.

FIG. 2 is an exploded parts diagram illustrating one example of credit card processing reader 100. The illustrated parts are broadly grouped into three groups plus a structural component. The groups are communications assembly 202, secure circuit assembly 204 and rear assembly 206. Frame 208 is the structural component. The naming convention with respect to each group is in no way limiting to that group or any other group, for example communications assembly 202 may include more than just communication components, or secure circuit assembly 204 does not mean or imply that other groups are not secure, or that communications may be engaged by rear assembly 206, to name a few examples.

The assembly of reader 100 may be completed by collapsing the parts illustrated in FIG. 2, with communications assembly 202 attaching to the topmost section of frame 208, then secure circuit assembly 204 inserting within frame 208 and underneath communications assembly 202, with rear assembly inserting within frame 208 and under secure circuit assembly 204. This top-down orientation is maintained in FIG. 3, but reversed in FIGS. 4 and 5.

Figure 3:
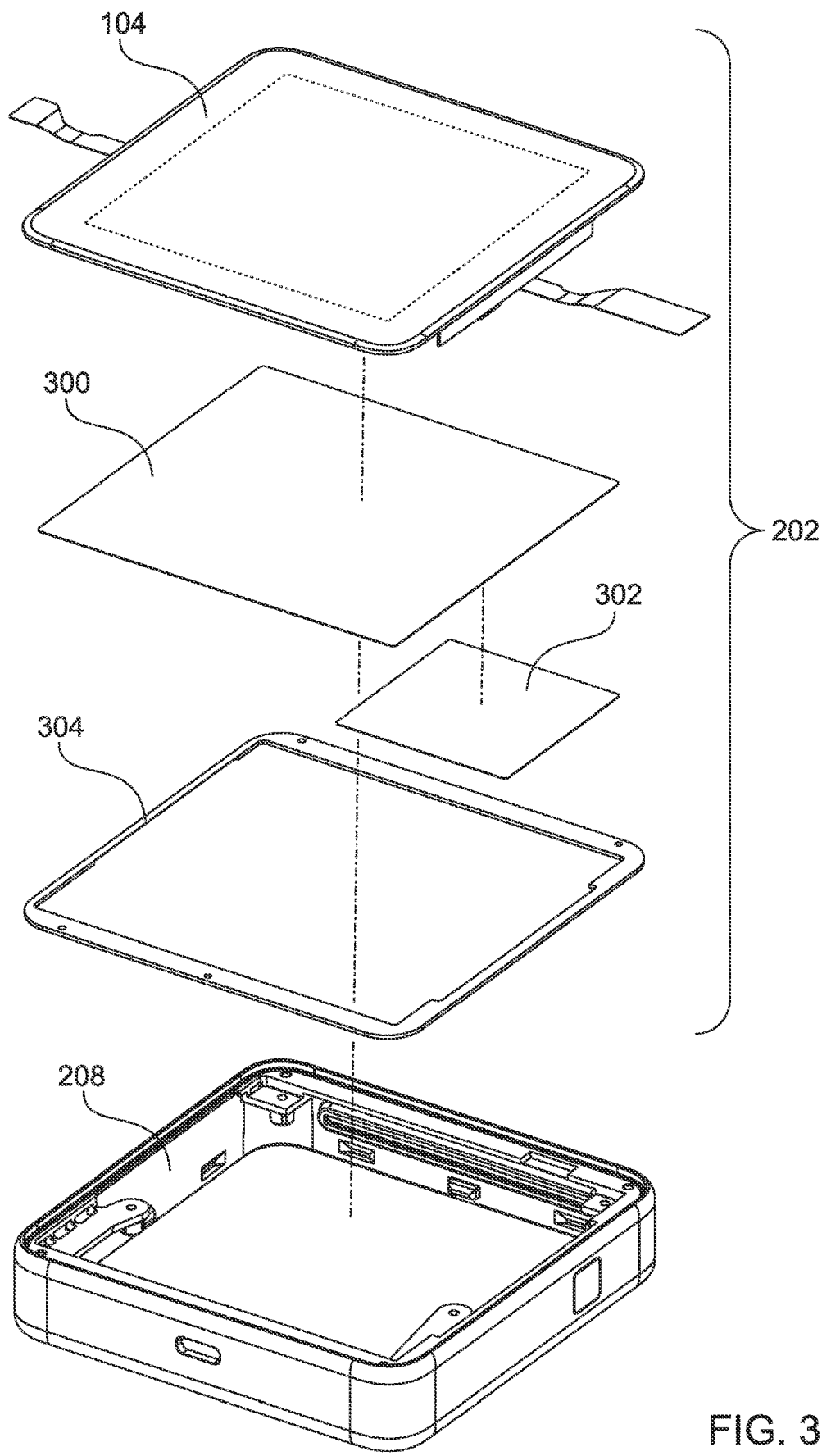
FIG. 3 is a partial exploded parts diagram illustrating one example of a communications assembly from a credit card reader.

FIG. 3 is a partial exploded parts diagram illustrating communications assembly 202 from FIG. 2 in a top-down orientation, as well as frame 208. Communications assembly 202 includes display 104 as previously described with respect to FIG. 1. Also included in communications assembly 202 is shield 300, reflector 302 and antennae 304. Shield 300 attenuates electromagnetic impulses between display 104 and antenna 304, as well as secure circuit assembly 204.

Shield 300 may be useful in reducing losses that occur from metal parts that are on the other side of shield 300 from display 104 (e.g. the PCB, the battery—conductive material that is near shield 300) reducing interference of communications and circuit processing by display 104. Shield 300 may be made from ferrite or other suitable shielding material for short range attenuation, for example NiZn, MnZn, etc.

Figure 5:
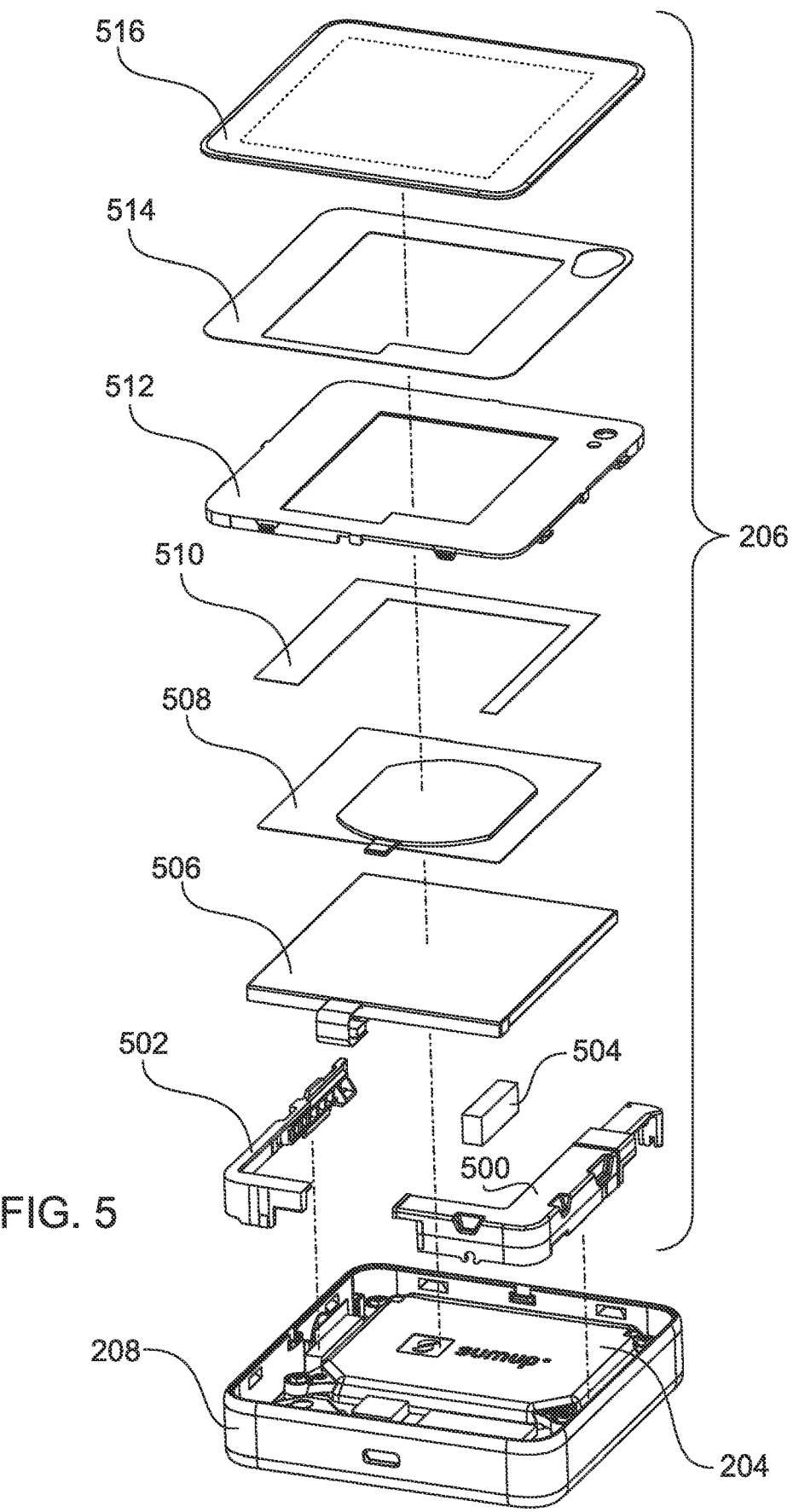
FIG. 5 is a partial exploded parts diagram illustrating one example of a rear assembly from a credit card reader.

Reflector 302 reduces efficiency losses that otherwise would occur for the cellular antenna (see FIG. 5). Reflector 302 may be made of a metal, for example copper, aluminum or steel.

Antennae 304 in this example may be a near field communication (NFC) antenna. NFC is based on inductive coupling between two antennas present on NFC-enabled devices, for example a POS credit card processing reader and a credit card. An NFC system can be used for communicating in one or both directions, using a frequency of 13.56 MHz. One practice of providing a small form factor for a POS reader is by placing a communication coil used by the NFC system in close proximity to the readout display of the processing device. Because of the proximity of the coil and display, operating aspects of the display may cause distortion of the waveforms from the NFC system.

Frame 208 provides structural support and integrity to reader 100 and may be made from injection molded plastic or any other suitable material and manufacturing method. From the perspective shown in FIG. 3, communications assembly 202 stack together near the top of frame 208 once pressed into place.

Figure 4:
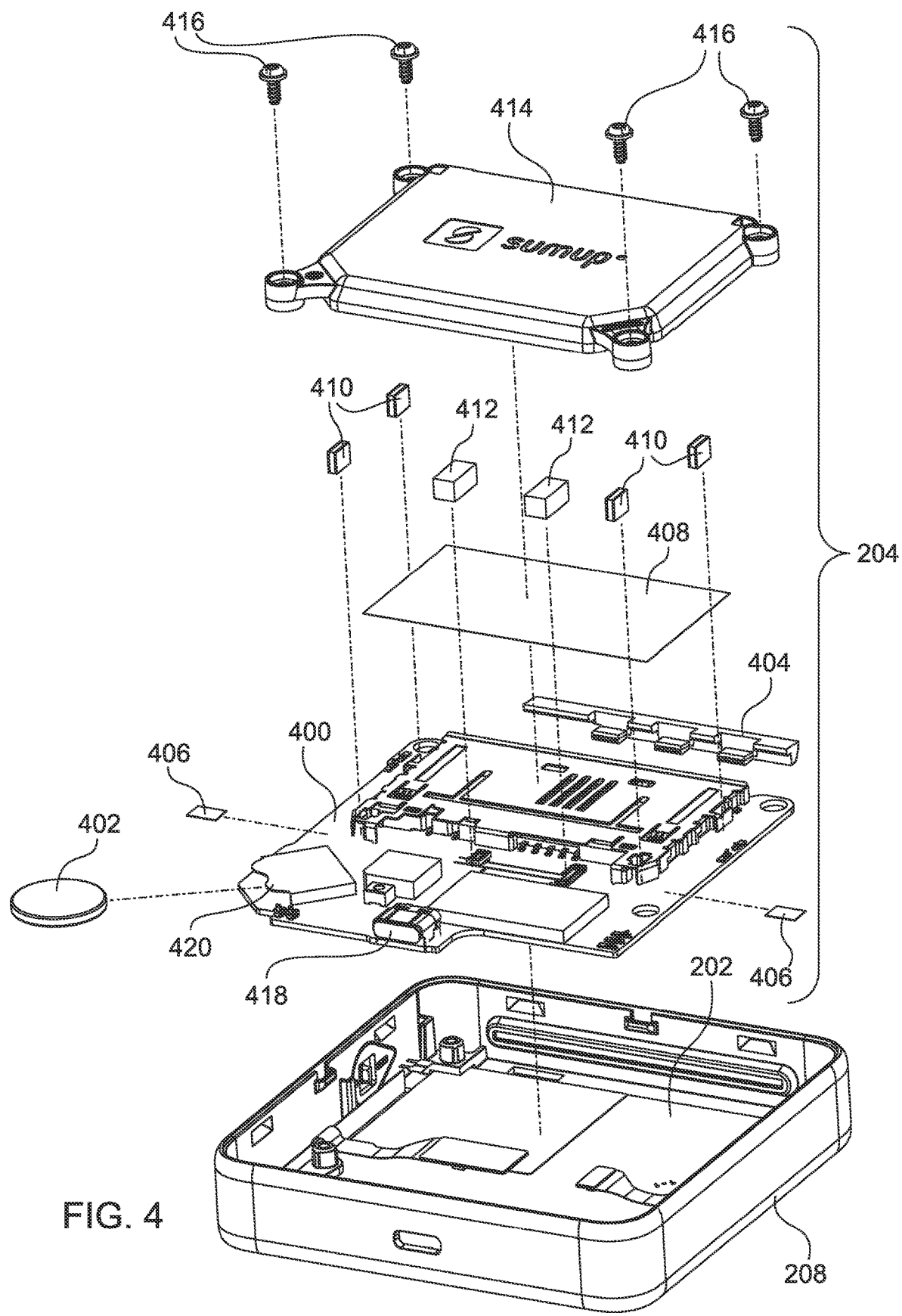
FIG. 4 is a partial exploded parts diagram illustrating one example of a secure circuit assembly from a credit card reader.

FIG. 4 is a partial exploded parts diagram illustrating secure circuit assembly 204 from FIG. 2 in a bottom-down orientation, as well as frame 208 and communications assembly 202. FIG. 4 is in the reverse orientation of FIG. 3, such that communications assembly 202 is pictured at the bottom of frame 208. Secure circuit assembly 204 includes printed circuit board (PCB) 400, battery 402, card guide 404, conductive tape 406, seal tape card connector 408, tamper switches 410, foam display cables 412, cover 414 and screws 416.

PCB 400 includes connector 418 (accessed through port 102), battery bracket 420, conductive LCD tape 406, seal tape card connector 408 to help reduce shorting issues, and foam spacers 412.

In a POS credit-card processing terminal or reader, secure covers and anti-tamper rubber switches are commonly used to pass penetration tests that verify the resistance of the reader against physical attack methods. Secure covers may have grabbers (also referred to as ribs) (not illustrated in FIG. 4) into which conductive rubber blocks are pressed to form a bridge between electrical pads. In one example, the conductive rubber blocks may be zebra connectors, or tamper switches 410. Electrical pads (not illustrated in FIG. 4) are respectively connected to electrical traces (not illustrated in FIG. 4) and are located on PCB 400. When cover 414 is tightened onto PCB 400 with screws 416, the resistance of tamper switches 410 changes until it is within a determined range. Once reader 100 is in use, if a change in resistance is detected with respect to the circuit connected to tamper switches 410, that is outside the determined range, then reader 100 registers that change as a tamper attempt and reader 100 may be blocked or disabled. Once activated, removing cover 414 dislodges tamper switches 410, causing a change in resistance across the electrical contacts and triggering a tamper attempt. Drilling into cover 414 and connecting a trace from one of the electrical pads, to a trace from another electrical pad (creating a short circuit), also causes a change in resistance and triggers a tamper attempt. This is one example of security for secure circuit assembly 204.

Battery 402 provides backup power for data retention in volatile memory in case of power loss as well as providing continuous power to security sensors. Card guide 404 assists in guiding a credit card at a proper place and angle into reader 100.

FIG. 5 is a partial exploded parts diagram illustrating rear assembly 206 from FIG. 2 in a bottom-down orientation, as well as frame 208 and secure circuit assembly 204. FIG. 5 is in the reverse orientation of FIG. 3, such that communications assembly 202 (not illustrated in FIG. 5) is at the bottom of frame 208, with secure circuit assembly 204 shown on top of communications assembly 202 and inside of frame 208. Rear assembly 206 includes communications assembly 500, button support assembly 502, foam button support 504, battery 506, wireless charging pad 508, adhesive 510, rear support 512, adhesive 514, rear panel 516.

Communications assembly 500 may connect to PCB 400 and provide additional communication capability, for example one or more of the following: cellular, Bluetooth, Bluetooth LE, Wi-Fi, Zigbee, infrared, near field (NFC), etc. Button support assembly 502 and foam button support 504 in conjunction serve as button 106 (see FIG. 1) for power and sleep operations. Button support assembly 502 may connect to PCB 400. Battery 506 provides power to reader 100 and may be rechargeable or non-rechargeable. Examples of rechargeable battery types include lead-acid, nickel-cadmium (NiCd), nickel-metal hydride (NiMH), lithium-ion (Li-ion), lithium-ion polymer (LiPo), and rechargeable alkaline batteries. Wireless charging pad 508 may recharge battery 506 through wireless inductive charging. A magnetic loop antenna (copper coil) is used to create an oscillating magnetic field, which can create a current in one or more receiver antennas in wireless charging pad 508. This current may be used to recharge battery 506. Rear support 512 is bonded to wireless charging pad 508 with adhesive 510. Rear panel 516 is bonded to rear support 512 with adhesive 514. Rear panel 516 may be made from any suitable material, for example metal, glass, plastic, etc.

Figure 6:
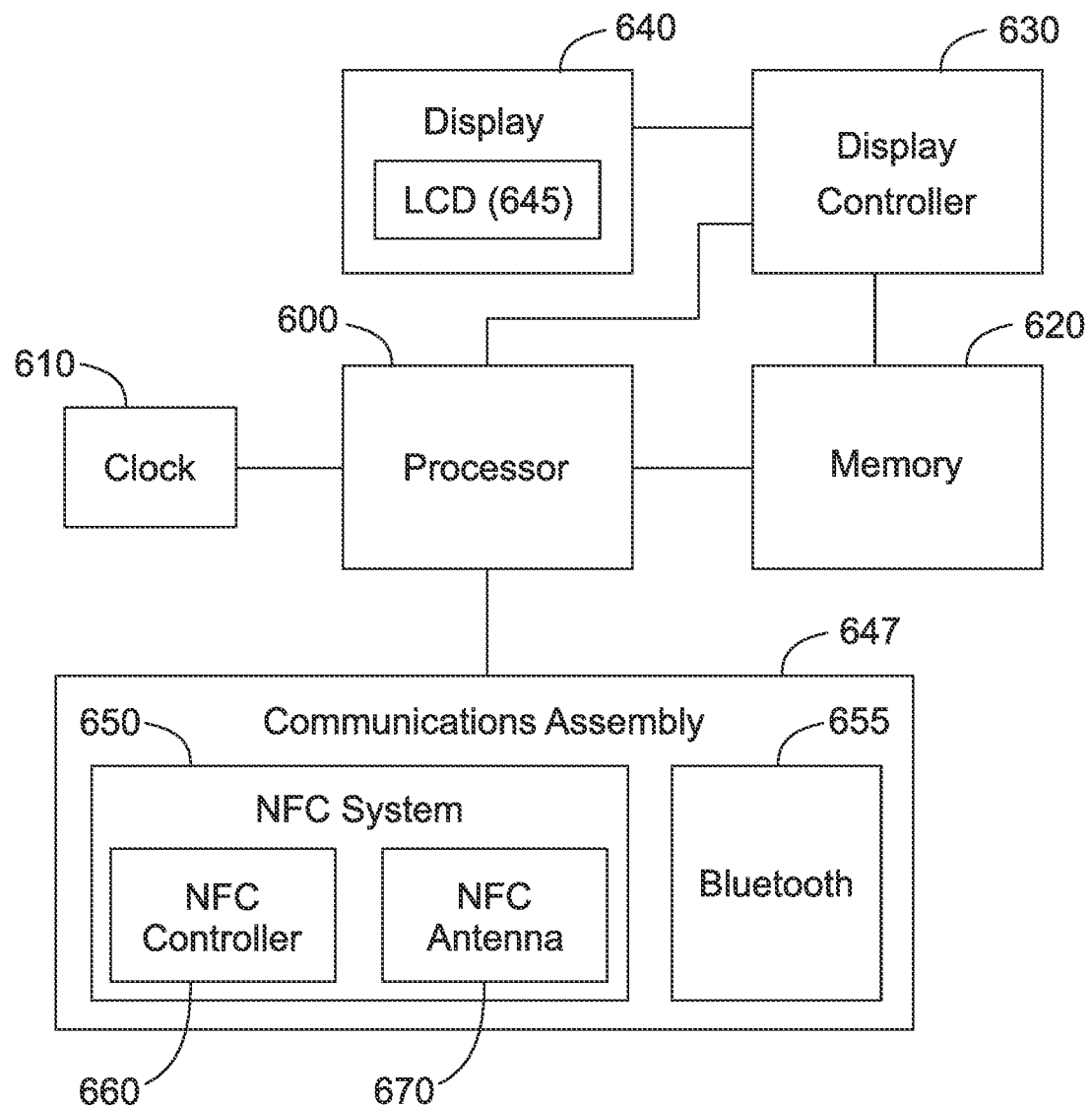
FIG. 6 is a block diagram illustrating components in a credit card reader.

FIG. 6 is a block diagram illustrating some of the components in reader 100. Processor 600 may be any of several types of processors, for example a microprocessor, a central processing unit, a microcontroller, programmable or not, or may be a combination of different processors. Processor 600 receives signals from clock 610, which may be any type of oscillating clock signal generator. Memory 620 provides programmable and non-programmable memory for reader 100 and may include dynamic random access memory, flash memory, embedded memory, memory controller(s), as well as non-programmable memory, for example. Memory 620 may be accessed by processor 600 as well as other components in reader 100. Display controller 630 may function with display 640. Display 640 may be any type of reflective, emissive, or combination reflective and emissive display, for example LED, LCD, OLED, MEMS, ELD, QLED. In one aspect, display 640 is liquid crystal display (LCD) 645. Processor 600 may be connected to communications assembly 647. In one aspect, communications assembly 647 may be communications assembly 500 (see FIG. 5). Communications assembly 647 may include wireless communication systems, for example NFC system 650 and bluetooth 655. NFC system 650 may include NFC controller 660 and NFC antenna 670. In one aspect, NFC antenna 670 is NFC antenna 304 (see FIG. 3). The above components may be connected through a shared platform, for example PCB 400, or secured inside case 208 (see FIG. 4).

Specifications are published by a consortium of international credit card companies known as EMVCo. Within those specifications are recommendations for the tolerances of the NFC waveform and what level of distortion of the NFC waveform is acceptable during NFC broadcasting. Due to the proximity of antenna 304 with display 104, distortion beyond the tolerances recommended by EMVCo is possible within reader 100. Distortion is evident during the write phase of display 640.

Figure 7:
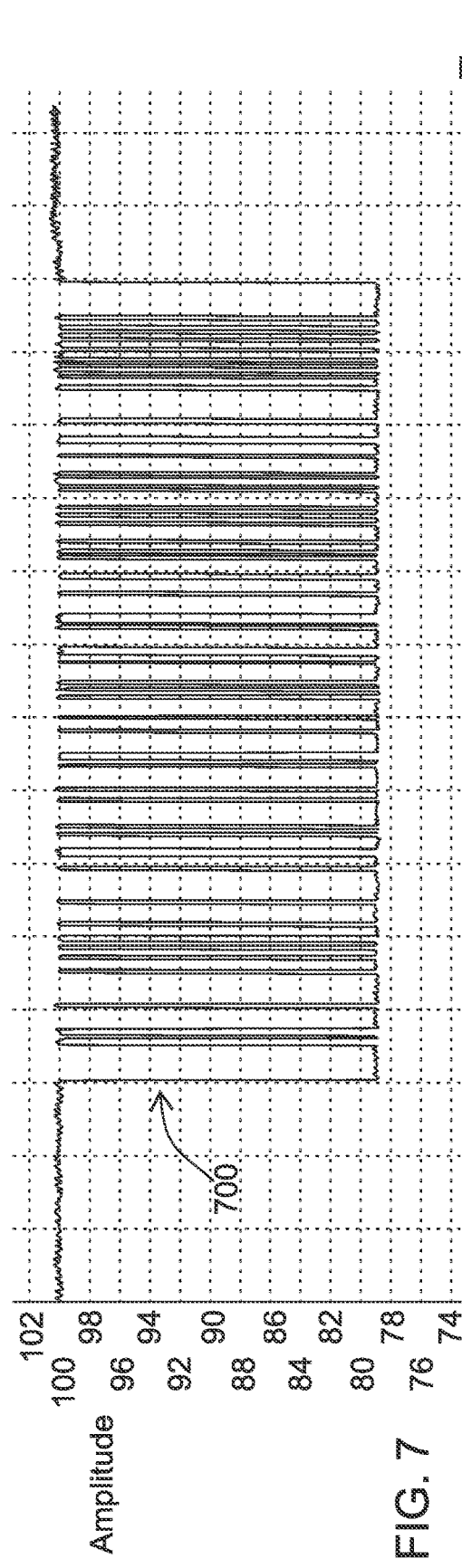
FIG. 7 is a waveform illustrating readout from a near field communication (NFC) system.

FIG. 7 is a waveform illustrating a readout from NFC system 650. The x-axis represents time while the y-axis represents amplitude of an NFC broadcast, for example a polling operation during which reader 100 is searching for a chip-enabled credit card. Waveform 700 represents a non-distorted NFC broadcast.

Displays may operate at a certain frame rate and have a corresponding refresh period, during which the display is either updated with new (changed) images, or entirely rewritten with changed or unchanged images. A variety of addressing schemes are possible depending on the desired frame rate, type of display technology, power consumption, and other factors. A typical display refresh period may include a write phase and a dormant phase, where display controller 630 (or a graphics card) addresses some or all of the pixels in display 640 during the write phase, and does not address pixels during the dormant phase. In one aspect, the write phase of display 640 causes distortion of an NFC broadcast.

Figure 8:
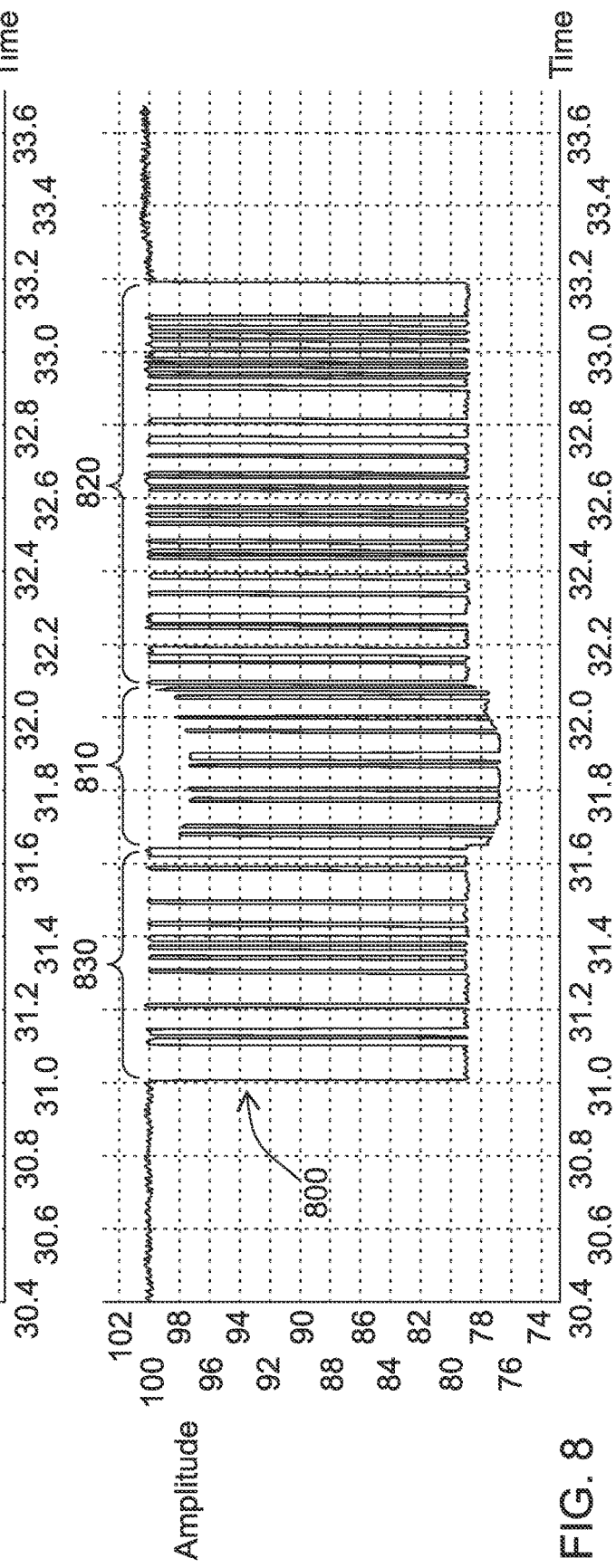
FIG. 8 is a waveform illustrating readout from a near field communication (NFC) system with interference.

FIG. 8 is a waveform illustrating a readout from NFC system 650 with interference (distortion) caused by the write phase of display 640. Waveform 800 represents an NFC broadcast with distortion present during time frame 810. The distortion is evident by a drop in amplitude of waveform 800 during time frame 810. In one aspect, time frame 810 corresponds to the write phase of display 640 and the distortion is caused by addressing pixels of display 640. At the end of time frame 810, the write phase ends and the remainder of the refresh period for display 640 is the dormant phase, where no pixels are addressed. A portion of this dormant period overlaps with time period 820, with no distortion from pixel addressing evident for waveform 800 during time period 820. Time period 830, just prior to time period 810, is part of the dormant phase in the prior refresh period. EMVCo publishes specifications for certifying readers and terminals according to its guidelines, and waveform 800 could result in a reader or terminal not passing certification due to the distortion present during time period 810. In order to pass certification, a card reader or terminal may synchronize its display addressing with the NFC system in order to avoid the distortion. In one aspect, NFC broadcasting may occur only during the dormant phase of each refresh period. In one aspect, the NFC broadcasting may start during the dormant phase of one refresh period and continue into the next refresh period. EMVCo specifications may be more stringent with respect to an NFC broadcast waveform in the beginning of broadcasting, than later during a broadcast.

In one aspect, NFC system 650 may have different operating modes, for example polling, card activation and transaction. Based on EMVCo specifications, reducing distortion in the beginning of polling may be more important than reducing it later, as polling continues, or during card activation or transaction periods. In one aspect, card readers and terminals may have a test mode into which they may be placed, for certification purposes. In one aspect, a test mode may replace polling. Reducing distortion in a test mode may be accomplished by synchronizing display addressing with NFC broadcasting.

Figure 9:
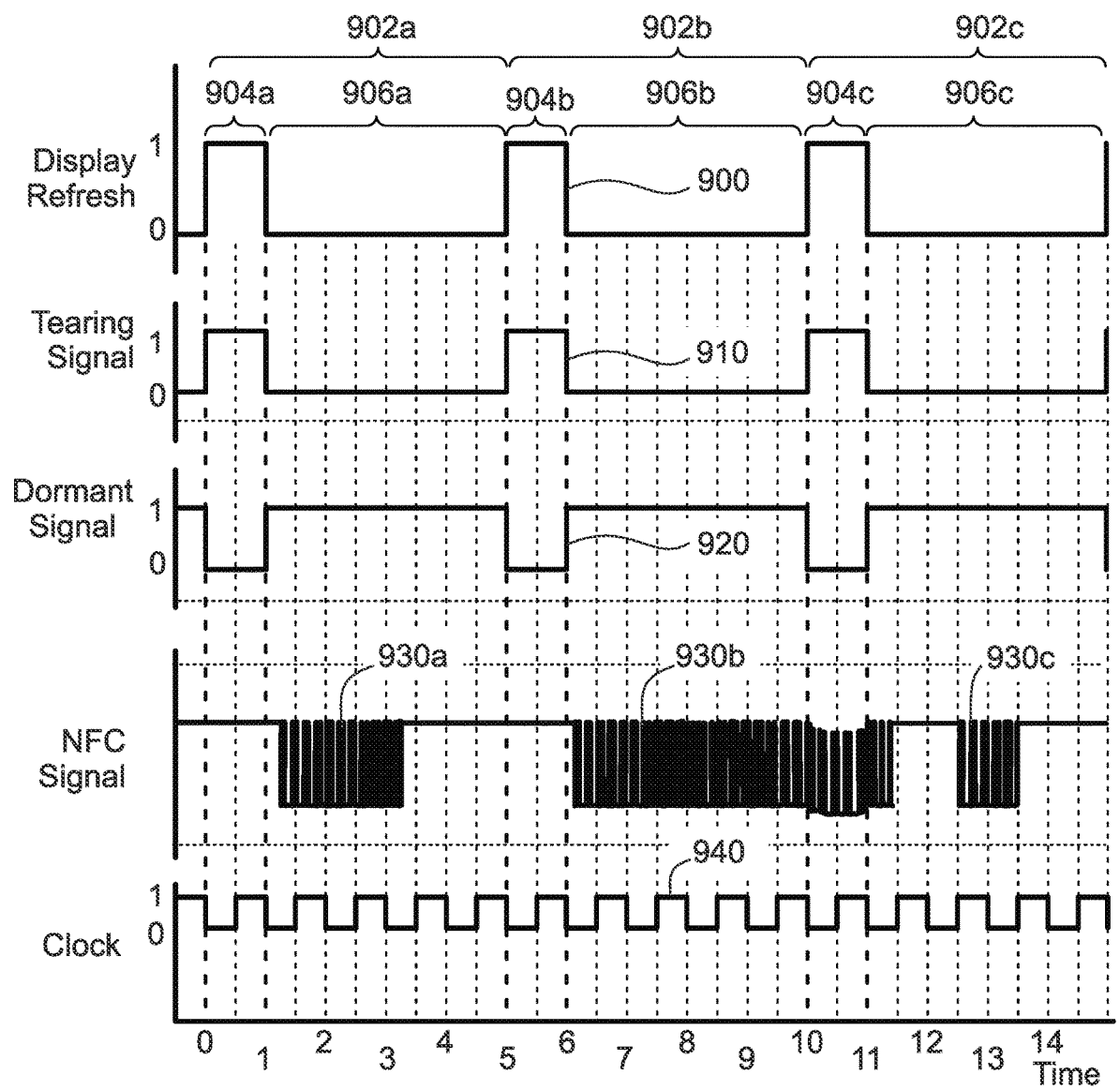
FIG. 9 is a waveform graph comparing timing and signal effects from one aspect of a synchronized system.

FIG. 9 is several waveform graphs comparing timing and signals from one aspect of a synchronized system. The signal and timing graphs are illustrative only, and not meant to represent any particular system. Modification to the timing, amplitude, clock signal and voltages would be expected in order to satisfy particular hardware configurations. For example, in FIG. 9 a refresh period is five clock cycles, with the write phase lasting one clock cycle. In a system using an LCD, for example, with a refresh rate at 120 Hz, the refresh period may be $\frac{1}{120}$ of a second with the write phase lasting a relatively shorter period of time than the dormant phase. The y-axis represents time and the x-axis represents logic states 0 (off) and 1 (on) for display refresh 900, tearing signal 910, dormant signal 920, and clock 940. Logic states may correspond to whatever voltages are appropriate, given a particular hardware configuration. The x-axis represents amplitude for NFC signals 930.

Display refresh 900 illustrates refresh periods 902a, 902b and 902c (collectively referred to as refresh periods 902) starting at time zero and each one may last five time periods. Refresh periods 902 include write phases 904a, 904b and 904c (collectively referred to as write phases 904), each one may last one time period, and dormant phases 906a, 906b and 906c (collectively referred to as dormant phases 906), and each one may last four time periods. Refresh periods 902, write phases 904 and dormant phases 906 may be shorter or longer than illustrated in this example. Refresh periods 902 represent addressing of display 640 by display controller 630 (see FIG. 6), and may or may not represent an actual signal. Write phases 904 represent pixel addressing and dormant phases 906 represent time periods between pixel addressing.

Tearing signal 910 may be present with a system having LCD 645. Tearing signal 910 is transmitted by LCD 645 during write phases 904. Tearing signal 910 may or may not be transmitted from other types of displays (for example OLED, MEMS, LED, etc.). Tearing signal 910 matches display refresh 900, being "on" during write phases 904 and "off" during dormant phases 906. Tearing signal 910 may be received by processor 600, communications assembly 647, NFC system 650, or wherever else it may be used in order to synchronize NFC system 650 with LCD 645.

In reader 100 with display 640 other than an LCD, tearing signal 910 may not be present. Dormant signal 920 may be provided by display controller 630, for example, as a means for synchronizing NFC system 650 with display 640. Dormant signal 920 may be provided by other components of reader 100. Dormant signal 920 is "off" during write phases 904 and "on" during dormant phases 906. Dormant signal 920 may be received by processor 600, communications assembly 647, NFC system 650, or wherever else it may be used in order to synchronize NFC system 650 with display 640.

NFC signals 930a, 930b and 930c (collectively referred to as NFC signals 930) represent an NFC broadcast by NFC system 650 when synchronized to write periods 904. NFC signals 930 may be the start of polling, or a test mode, for example. NFC signal 930a begins after the beginning of time period one. Write phase 904a ends at time period one, tearing signal 910 has transitioned from "on" to "off," and dormant signal 920 has transitioned from "off" to "on." NFC signal 930a begins during dormant phase 906a and ends during dormant phase 906a, lasting approximately two time periods, or two clock cycles, in this example. Because NFC signal 930a is broadcast during dormant period 906a, there is no distortion of NFC signal 930a by pixel addressing in display 640 (either in a system with LCD 645 or a system with a different type of display).

NFC signal 930b begins after the beginning of time period six. Write phase 904b ends at time period six, tearing signal 910 has transitioned from "on" to "off," and dormant signal 920 has transitioned from "off" to "on." NFC signal 930b begins during dormant phase 906b and continues into dormant phase 906c, lasting approximately five time periods, or five clock cycles, in this example. NFC signal 930b is not distorted during dormant phase 906b. NFC signal 930b is distorted by pixel addressing during write phase 904c. The distortion ends at the end of write phase 904c, and NFC signal 930b returns to a non-distorted shape in dormant phase 906c. As previously mentioned, synchronizing NFC system 650 with pixel addressing may be more important at the start of NFC broadcasting, than after a refresh period has passed. In a test mode (for example, a loop-back application, which is a test mode that may be used during certification), for example, certification requirements may relax after the first refresh period, allowing NFC broadcasting to continue despite distortion from pixel addressing. In a non-test mode, for example polling, other factors may play a role in continuing an NFC signal broadcast either into a write phase 904, through a write phase 904, or through multiple write phases 904.

NFC signal 930c begins at time period 13 and ends at time period 14, and lasts approximately one time period, or one clock cycle. NFC signal 930c begins and ends during dormant phase 906c. In one aspect and not illustrated, NFC signal 930c may have continued into the next refresh period.

Clock signal 940 is illustrated with each clock cycle taking one time period. In one aspect, synchronization between NFC broadcasting and display writing may be managed with clock signal 940. For example, NFC system 650 may be programmed to begin broadcasting an NFC signal after one clock cycle is completed and before a fifth clock cycle. Display controller 630 may be synchronized to address pixels from the start of the first clock cycle to the end of the first clock cycle. After every five clock cycles (the length of one of refresh periods 902), each one of display controller 630 and NFC system 650 may reset. In this example clock signal 940 is a common signal to each of display controller 630 and NFC system 650. Rather than synchronize display controller 630 directly with NFC system 650 (with tearing signal 910 or dormant signal 920, for example), an intermediary (clock signal 940, for example) may be used.

Figure 10:
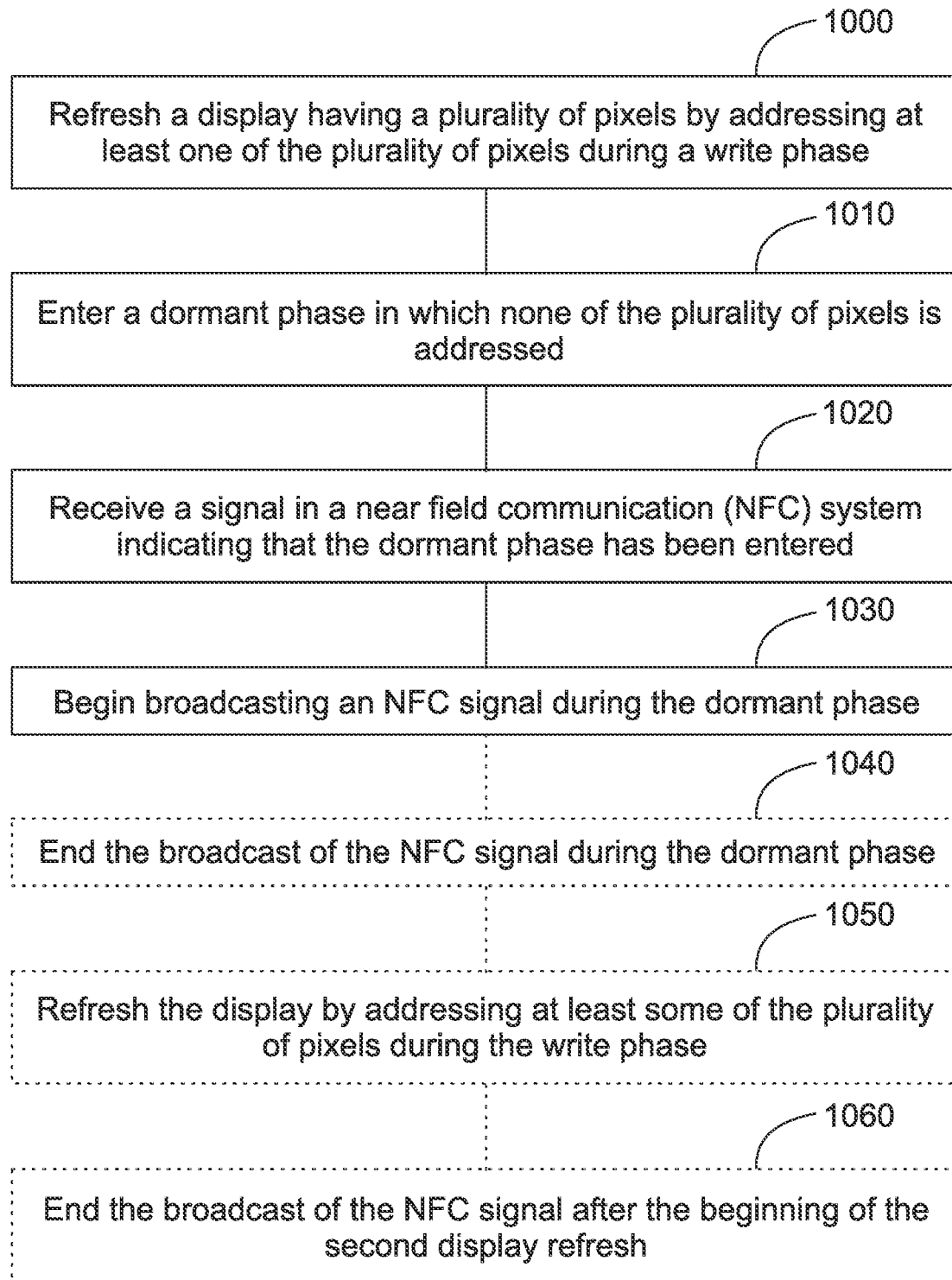
FIG. 10 is a flowchart illustrating one aspect of synchronizing a display with a communication system.

FIG. 10 is a flowchart illustrating a method of reducing interference with a communication system. In one aspect, refresh a display having a plurality of pixels by addressing at least one of the plurality of pixels during a write phase, block 1000. Enter a dormant phase in which none of the plurality of pixels is addressed, block 1010. Receive a signal in an NFC system indicating that the dormant phase has been entered, block 1020. Begin broadcasting an NFC signal during the dormant phase, block 1030. End the broadcast of the NFC signal during the dormant phase, block 1040. In the case that the broadcast of the NFC signal did not end in block 1040, refresh the display by addressing at least some of the plurality of pixels during the write phase, block 1050. End the broadcast of the NFC signal after the beginning of the second display refresh, block 1060.

In one aspect, block 1020 may include receiving a tearing signal until the end of the write phase, at which point the tearing signal stops, indicating an end to the write phase. In one aspect, block 1020 may include receiving a clock signal timed with an end to the write phase.

Figure 11:
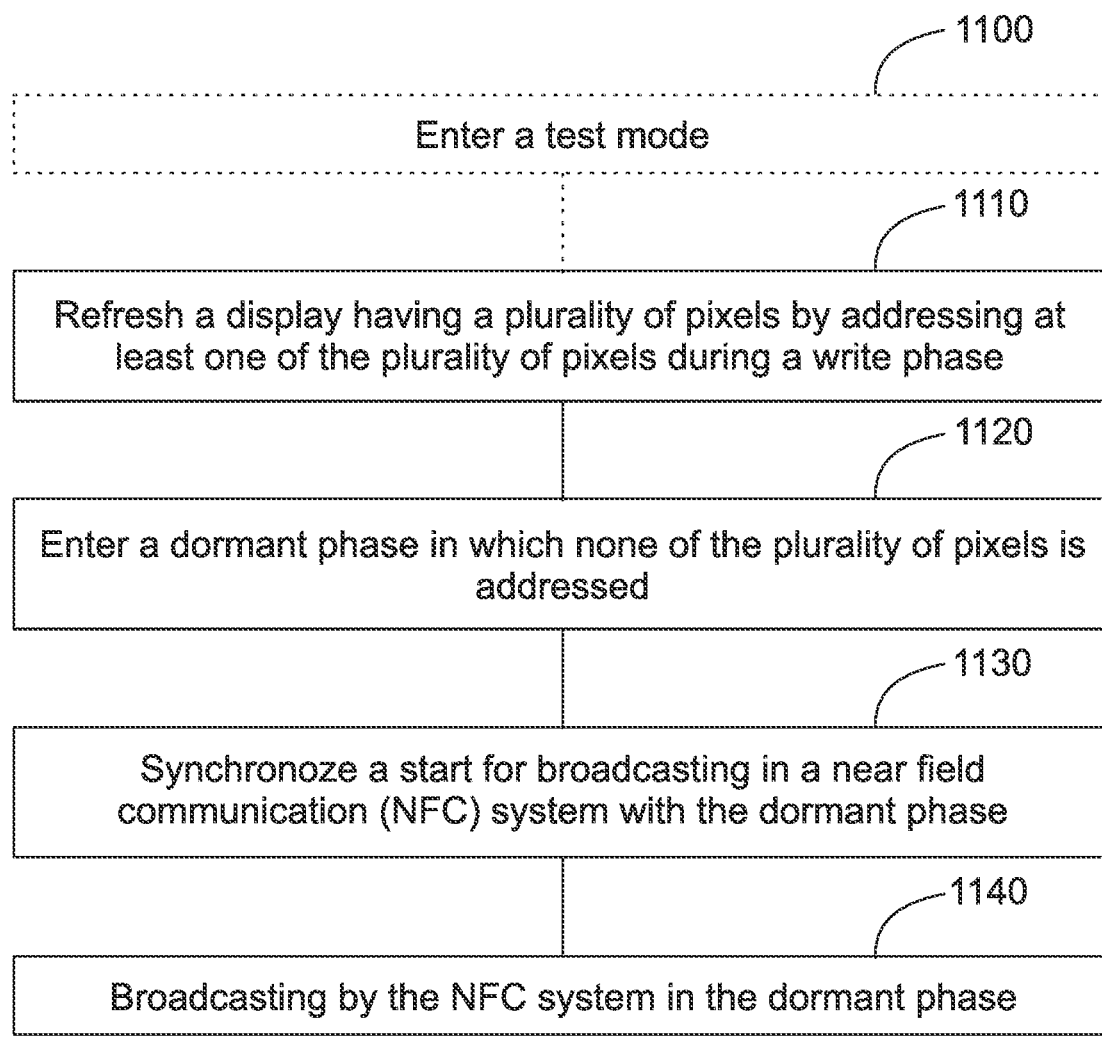
FIG. 11 is a flowchart illustrating one aspect of synchronizing a display with a communication system.

FIG. 11 is a flowchart illustrating one method of reducing interference in a credit card processing device. In one aspect, the credit card processing device may optionally enter a test mode, block 1100. Refresh a display having a plurality of pixels by addressing at least one of the plurality of pixels during a write phase, block 1110. Enter a dormant phase in which none of the plurality of pixels is addressed, block 1120. Synchronize a start for broadcasting in an NFC system with the dormant phase, block 1130. Broadcast by the NFC system in the dormant phase, block 1140.

This disclosure refers to the term "reader" throughout, and while specifically directed towards a credit card reader, the disclosure applies equally well to a traditional credit card terminal. Nothing in the disclosure should be taken as limiting to a reader over a terminal. Moreover, many aspects of the disclosure apply equally well to any electronic device, as would be recognized by one skilled in the art.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps, or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include features of a claim to any other independent claim even if this claim is not directly made dependent to the independent claim.

What is claimed is:

1. A point-of-sale credit card device comprising:
   a case;
   a display coupled to the case, the display having a plurality of pixels and configured to be refreshed during a plurality of refresh periods, each of the refresh periods including a write phase in which at least one of the plurality of pixels is addressed, and a dormant phase in which none of the plurality of pixels are addressed;
   a printed circuit board (PCB) coupled to the case;
   a display controller coupled to the PCB, the display controller configured to provide addressing for at least some of the plurality of pixels during the write phase; and
   a near-field-communication (NFC) system coupled to the PCB and configured to broadcast an NFC signal for near-field communication, the NFC system synchronized to the display refresh period and configured to begin broadcasting the NFC signal during the dormant phase based on the synchronization, continue broadcasting in an approximately continuous manner through the dormant phase, and continue broadcasting into at least the write phase of the following refresh period.

2. The point-of-sale credit card device of claim 1, comprising the NFC system configured to receive a signal as the synchronization to the display refresh period.

3. The point-of-sale credit card device of claim 2, comprising the display further comprising a liquid crystal display (LCD), the signal being a tearing signal, the LCD further configured to transmit the tearing signal during the write phase and not transmit the tearing signal during the dormant phase, the NFC system further configured to begin broadcasting the NFC signal when the NFC system stops receiving the tearing signal.

4. The point-of-sale credit card device of claim 2, comprising the signal being a dormant signal, the dormant signal being on during the dormant phase and being off during the write phase, the NFC system further configured to begin broadcasting the NFC signal after the dormant signal goes on.

5. The point-of-sale credit card device of claim 1, comprising the NFC system further configured to receive a clock signal and programmed to begin broadcasting the NFC signal at a specific time interval based on the clock signal, the NFC system configured to begin broadcasting the NFC signal during the dormant phase.

6. The point-of-sale credit card device of claim 5, comprising the NFC system further configured to have an operating mode and a test mode, the operating mode having a polling phase.

7. The point-of-sale credit card device of claim 6, comprising the NFC system further configured to synchronize the broadcasting of the NFC signal with the display refresh only during the test mode.

8. The point-of-sale credit card device of claim 6, comprising the NFC system further configured to synchronize the broadcasting of the NFC signal with the display refresh during the polling phase.

9. The point-of-sale credit card device of claim 8, comprising the NFC system further configured to begin broadcasting the NFC signal during the dormant phase, continue broadcasting in an approximately continuous manner during the dormant phase, and stop broadcasting during the same dormant phase in which the NFC system began broadcasting.

10. The point-of-sale credit card device of claim 8, comprising the NFC system further configured to broadcast approximately at a frequency of 13.56 MHz and to experience distortion of the NFC signal, from the display, during the write phase.

11. The point-of-sale credit card device of claim 10 where the point-of-sale credit card device is a credit card reader.

12. A method of reducing interference comprising:
  refreshing a display having a plurality of pixels by addressing at least one of the plurality of pixels during a write phase;
  entering a dormant phase in which none of the plurality of pixels is addressed;
  receiving a signal in a near field communication (NFC) system indicating that the dormant phase has been entered;
  beginning a broadcast of an NFC signal during the dormant phase;
  refreshing the display, after beginning a broadcast of an NFC signal, by addressing at least some of the plurality of pixels during the write phase; and
  ending the broadcast of the NFC signal after the beginning of the second display refresh.

13. The method of claim 12 wherein receiving a signal in an NFC system indicating that the dormant phase has been entered comprises receiving a tearing signal until the end of the write phase, at which point the tearing signal stops, indicating an end to the write phase.

14. The method of claim 12 wherein receiving a signal in an NFC system indicating that the dormant phase has been entered comprises receiving a clock signal timed with an end to the write phase.

15. The method of claim 14 further comprising:
  counting clock cycles in order to track the dormant phase.

16. A method of reducing interference in a credit card processing device comprising:
  refreshing a display having a plurality of pixels by addressing at least one of the plurality of pixels during a write phase;
  entering a dormant phase in which none of the plurality of pixels is addressed;
  synchronizing a start for broadcasting in a near field communication (NFC) system with the dormant phase; and
  broadcasting by the NFC system in the dormant phase and into another write phase.

17. The method of claim 16 further comprising:
  entering a test mode.

* * * * *